United States Patent [19]

Smith

[11] Patent Number: 5,418,260

[45] Date of Patent: May 23, 1995

[54] PROCESS FOR THE PRODUCTION OF POLYURETHANE ARTICLES FROM URETONIMINE BASED COMPOSITIONS AND ETHYLENE OXIDE RICH POLYETHER POLYOLS

[75] Inventor: Stuart B. Smith, Conyers, Ga.

[73] Assignee: ECP Enichem Polimeri Netherlands, B.V., Amsterdam, Netherlands

[21] Appl. No.: 160,782

[22] Filed: Dec. 3, 1993

Related U.S. Application Data

[63] Continuation-in-part of Ser. No. 130,798, Oct. 4, 1993, abandoned.

[51] Int. Cl.6 .................... C08G 18/02; C08G 18/12
[52] U.S. Cl. .................................. 521/159; 521/163; 521/170; 521/174; 528/60; 528/76; 528/77
[58] Field of Search ............ 521/167, 176, 159, 163, 521/170, 174; 528/60, 77, 76

[56] References Cited

U.S. PATENT DOCUMENTS

| | | |
|---|---|---|
| 4,218,543 | 8/1980 | Weber et al. . |
| 4,246,363 | 1/1981 | Turner et al. . |
| 4,269,945 | 5/1981 | Vanderhider et al. . |
| 4,396,729 | 8/1983 | Dominquez et al. . |
| 4,433,067 | 2/1984 | Rice et al. . |
| 4,444,910 | 4/1984 | Rice et al. . |
| 4,595,742 | 6/1986 | Nalepa et al. . |
| 4,631,298 | 12/1986 | Presswood . |
| 4,786,656 | 11/1988 | Presswood et al. . |
| 5,059,634 | 10/1991 | Smith ................... 521/167 |

Primary Examiner—John Kight, III
Assistant Examiner—John M. Cooney, Jr.
Attorney, Agent, or Firm—Oblon, Spivak, McClelland, Maier & Neustadt

[57] ABSTRACT

This invention relates to a polyurethane RIM composition, a method of spray molding a polyurethane composition and molded articles of a polyurethane RIM composition.

18 Claims, No Drawings

PROCESS FOR THE PRODUCTION OF POLYURETHANE ARTICLES FROM URETONIMINE BASED COMPOSITIONS AND ETHYLENE OXIDE RICH POLYETHER POLYOLS

This application is a continuation-in-part of application Ser. No. 08/130,798 filed on Oct. 4, 1993, now abandoned.

BACKGROUND OF THE INVENTION

1. Field of the Invention

This invention relates to a process for the production of polyurethane articles from uretonimine based compositions and ethylene oxide rich polyether polyols, a polyurethane RIM composition and molded articles obtained thereby by RIM and spray molding.

2. Discussion of the Background

Polyurethane polymers prepared from an active hydrogen-containing compound and an isocyanate are widely employed in molding processes, particularly reaction injection molding (hereinafter RIM) processes. RIM articles are finding increased usage as automotive fascia.

The basic polyurethane polymer systems are typically based on an OH polyol component, an OH cross-linker and an isocyanate component. However this system suffers from long cream, demolding and cycle times, greatly increasing the processing time. Modifications to the basic polyurethane system to shorten these processing times has been achieved through substitution of the OH cross-linker with an aminic cross-linking system. Typically, thermosetting urethane polymer compositions comprise an isocyanate component with an excess of isocyanate groups and an aromatic diamine as a chain extender, to form a polyurea-type urethane polymer. Optionally, the polymer composition may also contain additional amounts of a reactive polyol to form a hybrid urea-urethane polymer. Such systems greatly decrease the cream and demolding times, therefore enabling much shorter cycling times in a RIM process.

The use of chain extenders, such as di-alkyl aromatic diamines, and more particularly di-ethyltoluene diamines and di(alkylthio)aromatic diamines are often used with isocyanate pre-polymers alone or with a polyol component to form a polyurea/polyurethane molding RIM composition (for example U.S. Pat. Nos. 4,595,742, 4,631,298, and 4,786,656). While an increase in the flexural modulus is observed through the addition of di-alkyl(thio)aromatic diamines, these compositions are still limited with respect to flexural modulus without observing "cold break" on demolding. "Cold Break" is a brittleness observed in the molded article during demolding. The presence of cold break causes the molded article to fracture on demolding. When trying to achieve a higher flexural modulus, to above 80,000 psi, by increasing the isocyanate content of the isocyanate component (i.e. higher % NCO), these materials suffer "cold break". Alternatively attempts to increase the flexural modulus by increasing the functionality of the polyol component also suffers from "cold break". Accordingly, efforts to increase the flexural modulus while preventing "cold break" is an on going area of research.

In addition to the mechanical properties of the polyurethane polymer, the processing of the polymer systems plays an important role in the usefulness of a polyurethane system. In RIM processing, a short gel time is desired to increase the productivity of the overall process. However, polyurethane systems based on an OH polyol component, an OH cross-linker and an isocyanate component had a gel time of from 5–8 seconds and a cycle time of from 3–3.5 min. Polyurethane systems using $-NH_2$ crosslinkers and $-OH$ polyols (for example U.S. Pat. Nos. 4,595,742, 4,631,298, and 4,786,656) reduced the gel time to about 1.2 seconds and the cycle time to 1.5–2 min. This greatly increased the productivity of RIM processes using these systems, but these $-NH_2$ crosslinkers and $-OH$ polyols systems suffered from an inability to increase the flexural modulus above 80,000 psi without observing "cold break" without the addition of fillers.

Polyurea systems based on amine terminated polyether resins and aminic cross-linkers have been developed (U.S. Pat. Nos. 4,433,067 and 4,444,910), which afford superior heat resistance and mechanical properties, and due to the extremely high reactivity of the amine terminated polyether resin, the gel times are extremely short, in the range of 0.7 seconds. Such a rapid reaction rate makes these systems very difficult to manipulate, and also severely limits the type of RIM technique for which such a composition is suitable. For example, Structural Reaction Injection Molding (S-RIM) is not applicable to such a system due to the short reaction time, resulting in incomplete wetting of the structural reinforcement.

It has also been discovered that the flexural modulus of a polyurethane composition based on MDI-polyol prepolymer and an aromatic diamine can be increased beyond 80,000 psi at 75° F. while being substantially free of "cold break" by the addition of a "cold break" additive such as triethanolamine or a triethanol amine-ethylene oxide end capped reaction product (U.S. Pat. No. 5,059,634). However the mechanical properties and processability of the "cold break" containing polyurethane compositions can still be improved.

The polyether polyol component in a polyurethane system is typically based on ethylene oxide or propylene oxide or a mixture of the two. Block copolymers may be manufactured by first reacting propylene glycol with propylene oxide to form a homopolymer followed by reaction with ethylene oxide to give a block copolymer. Since the primary hydroxyl groups resulting from ethylene oxide are more reactive than secondary hydroxyl groups, the polyols produced in this manner are more reactive. In this fashion "EO capped" polyether polyols are produced. Random copolymers are obtained by polymerizing mixtures of propylene oxide and ethylene oxide.

However, in RIM polyurethane systems, the amount of ethylene oxide is generally limited to less than about 30%, either as "EO capping" or as part of the random copolymer. High amounts of ethylene oxide was thought to produce a polyol component with inferior mechanical properties and hygroscopicity in the resulting polyurethane.

In addition, there exists a need to improve existing fiberglass spray molding processes. Typically, these systems are based on polyester resin which are spray molded to form automotive body panels. However the polyester resin systems have an environmental drawback in the release of large amounts of volatile organic compounds, particularly styrene. The Clean Air Act of 1990 (Title 42, section 7412(b)) has identified styrene as a hazardous air pollutant. Accordingly, it is anticipated that new government standards will be issued to limit the release of styrene into the environment, thereby greatly increasing the cost associated with traditional fiberglass spray molding processes. A spray molding process with low volatile organic compound emissions is therefore desired.

Consequently, research continues into systems with excellent mechanical properties, but more flexible gel times and the elimination of "cold break" and which are simple to make.

SUMMARY OF THE INVENTION

Accordingly, one object of this invention is to provide a process for the production of polyurethane articles from uretonimine based compositions and ethylene oxide rich polyether polyols. The object of the present invention is provided for by a reaction injection molding process comprising reaction injection molding:

A) an isocyanate quasi pre-polymer component comprising the reaction product of:
  i) a uretonimine modified MDI having a free isocyanate content of from 20–30% by weight NCO; and
  ii) a polyether triol component obtained from the reaction of a triol starter with a mixture of ethylene oxide and propylene oxide, containing 10–85% by weight of ethylene oxide and having a number average molecular weight of from 400–6,000;

wherein said isocyanate quasi pre-polymer has a free isocyanate content of from 10–27% by weight NCO; and B) a polyol component comprising:
  i) 25–250 pbw of a polyether polyol component of functionality of 2–3 having from 50–100% by weight ethylene oxide units and 0–50% by weight propylene oxide units and a number average molecular weight of 400–6,000;
  ii) 25 pbw of an aromatic diamine; and
  iii) 0–40 pbw of an aminic polyol;
  iv) 0.01–0.5 pbw of an organometallic urethane forming catalyst; and
  v) 0–5.0 pbw of an amine urethane forming catalyst, wherein pbw is based on 25 pbw of the aromatic diamine component.

The inventor of the present invention has discovered that by using a uretonimine based isocyanate quasi pre-polymer (A), and a polyether polyol with an ethylene oxide content of from 50–100% (B), a thermosetting polyurethane polymer can be obtained with improved thermal and impact resistance and very high flexural modulus, while avoiding the problem of cold break. Improved processability in terms of gel times (longer gel times) and demolding times (shorter demolding times) can also be achieved.

DETAILED DESCRIPTION OF THE PREFERRED EMBODIMENTS

The isocyanate quasi pre-polymer is the reaction product of a uretonimine modified MDI (A(i)) with a polyether triol component (A(ii)). It has a final free NCO content of 10–27% by weight, more particularly 14–22% by weight. The isocyanate quasi pre-polymer preferably has an isocyanate equivalent weight of 420–168 and a viscosity of 1,000–150 centipoise at 75° F.

The isocyanate quasi pre-polymer is prepared by reacting 1 part of the triol component with from 1–6 part of the uretonimine modified MDI at a temperature of from room temperature (72° F.) to 300° F., more preferably 120°–150° F., for a period of 2–3 hours.

The materials may be reacted at room temperature, but preferably they are heated to a temperature of 150° F.

The polyether triol component (A(ii)) is a polyether triol based on a triol starter such as glycerine. The polyether triol has an ethylene oxide (EO) content of from 10–85 wt. % and a propylene oxide (PO) content of from 15–90 wt. %. More preferably, the EO content is 65–85 wt. % and the PO content is 15–35 wt. %, most preferably a triol having 70 wt. % EO and 30 wt. % PO is suggested.

The polyether triol has a number average molecular weight $M_n$ of 400–6,000, preferably 2,000–5,000, more preferably 4,800. However the triol component should be a liquid at the processing temperatures for RIM of about 80–100° F., preferably 90° F.

The polyether triol component can be either a random heteropolymer of polyethylene oxide and polypropylene oxide units or end capped with ethylene oxide.

The polyether triol component has a hydroxyl number of from 28–38, more preferably 35. A suitable material is sold commercially as POLY-G 83-34 (a trademark of Olin Chemicals).

The polyether triol component may be made by conventional methods known to those of ordinary skill in the art. More specifically, polyether triols can be made by the reaction of ethylene oxide and/or propylene oxide with a triol, with the aid of a catalyst such as potassium or sodium hydroxide. A suitable method is described in *Kirk-Othmer Encyclopedia of Chemical Technology*, 3rd, Ed., vol 18, p638+.

The uretonimine modified MDI has a free isocyanate content of 20–30% by weight NCO, more preferably 27–29%. The uretonimine modified MDI preferably has a viscosity of 40 cps at 20° C. Examples of commercial materials of this type are ISONATE 143L (from Upjohn Co.-Dow), RUBINATE LF-168 (from ICI), and Tedimon-316 (from EniChem).

The Component B used in the present process comprises:
  i) 25–250 pbw of a polyether polyol component of functionality of 2–3 having from 50–100% by weight ethylene oxide units and 0–50% by weight propylene oxide units and a number average molecular weight of 400–6,000;
  ii) 25 pbw of an aromatic diamine; and
  iii) 0–40 pbw of an aminic polyol;
  iv) 0.01–0.5 pbw of an organometallic urethane forming catalyst; and
  v) 0–5.0 pbw of an amine urethane forming catalyst, wherein pbw is based on 25 pbw of the aromatic diamine component.

The polyether polyol component (B(i)) is a polyether polyol based on a di- or triol such as ethylene glycol or glycerine. The polyether polyol has an ethylene oxide (EO) content of from 50–100 wt. % and a propylene oxide (PO) content of from 0–50 wt. %. More preferably, the EO content is 65–85 wt. % and the PO content is 15–35 wt. %, most preferably a polyol having 70 wt. % EO and 30 wt. % PO is preferred.

The polyether polyol has a number average molecular weight $M_n$ of 400–6,000, preferably 4,000–5,000 and most preferably 4,800. However the polyether polyol component should be a liquid at the processing temperatures for RIM of about 80–100° F., preferably 90° F.

The polyether polyol component can be either a random heteropolymer of polyethylene oxide and polypropylene oxide units or end capped with ethylene oxide, provided that the ethylene oxide content is 50–100 wt. %.

The polyether polyol component has a hydroxyl number of from 28–38, more preferably 35. A suitable material is sold commercially as POLY-G 83-34 (a trademark of Olin Chemicals).

The synthesis of suitable polyether polyols is as described above for polyether triol A(ii).

As the aromatic diamine component, are diethyltoluene diamine or DETDA which is commercially available as a product of the Ethyl Corporation (ETHACURE ® 100) and comprises a mixture of positional isomers having about 76% 1-methyl-3,5-diethyl-2,4-diaminobenzene and about 24% 1-methyl-3,5-diethyl-2,6-diaminobenzene. Also suitable as the aromatic diamine component is dimethylthiotoluenediamines such as 1-methyl,-3,5-dimethylthio-2,4-diaminobenzene and 1-methyl-3,5-dimethylthio-2,6-diaminobenzene available from the Ethyl Corporation as (ETHACURE ®300).

The aromatic diamine component may be made by conventional means known to those of ordinary skill in the art. The synthesis of 1-methyl,-3,5-dimethylthio-2,4diaminobenzene is described in U.S. Pat. No. 4,595,742.

As the aminic polyol component, are triethanolamine or $C_2$–$C_3$ alkyleneoxide adducts of triethanolamine, diethanolamine, ethylenediamine, toluenediamine, etc. A triethanolamine end capped ethylene oxide or propylene oxide adduct of molecular weight ranging from 600–1,000 or more is preferred. Also suitable are aromatic diamines such as toluenediamine which are both ethoxylated or propoxylated, as well as ethylene diamine polyols such as ethylene diamine ethoxylated or propoxylated or both polyols. The aminic polyol component may also be used as a mixture of the above-identified materials. An aminic polyol with 10–20% by weight of ethylene oxide units and 80–90% by weight of propylene oxide units is preferred. Especially suitable is a mixture of toluenediamine of OH # 340 and ethylene diamine propoxylated polyol.

The aminic polyol component may be made by conventional means known to those of ordinary skill in the art in a manner analogous to the synthesis of hydroxy based polyether polyols.

As the organometallic catalyst component are urethane forming catalysts which are known to those of ordinary skill in the art.

As the amine catalysts, are tertiary amine urethane forming catalysts which are known to those of ordinary skill in the art.

Organometallic and amine catalysts are disclosed in Saunders and Frisch "Polyurethanes, Chemistry and Technology" Interscience, New York, 1964

The polyether polyol, aromatic diamine, aminic polyol, organometallic catalyst and amine catalyst components form the B component of the polyurethane system. The system contains from 25–250 pbw of the polyether polyol, more preferably 25–100; 25 pbw of the aromatic diamine component; 0–40 pbw of the aminic polyol component, 0.01–0.5 pbw, preferably 0.01–0.2 pbw, of an organometallic urethane forming catalyst and 0–5.0 pbw, preferably 0–2.0 pbw, of an amine urethane forming catalyst, wherein pbw is based on 25 pbw of aromatic diamine.

The reactants which form the B component are mixed with the isocyanate quasi pre-polymer at a 102 index or greater. A 102 index is known to those of ordinary skill in the art as meaning that at least 1.02 equivalents of isocyanate groups in the isocyanate quasi prepolymer A are reacted per equivalent of active hydrogen containing components based on the B component. Preferably the index is in the range of 102–110, more preferably 105.

The resulting polyurethane polymer has a flexural modulus of $\geq 80,000$ psi at 75° F., preferably >90,000 psi at 75° F. and even more preferably >100,000 psi at 75° F., without exhibiting cold break.

Gel times higher than 2 sec and demolding times lower than 60 sec are achievable and improve the processability latitude.

The process of forming polyurethane compositions according to the present invention is accomplished by conventional reaction injection molding techniques (RIM), or reinforced reaction injection molding (RRIM) or structural reaction injection molding (SRIM) techniques. The process also allows for spray molding. This includes both open and closed mold processes. This allows for a substitute spray molding composition which gives physical properties as good or better than conventional polyester resin fiberglass article, yet avoids the problem of volatile organic compounds. In addition, the composition can be applied using existing spray molding equipment.

The present invention also allows for the formation of a Structural Reaction Injection Molding (SRIM) molded article with an A class surface. This is achieved by RIM molding or spraying a surface layer of the polyurethane composition of the present invention on either or both surfaces of a mold to form the exterior surfaces, followed by forming an intermediate layer by conventional SRIM methods. The polyurethane surface layer may be filled or unfilled with conventional fillers and additives. Conventional SRIM articles often suffer the draw back of a surface layer which reveals the fiberglass structural reinforcement. By forming a surface layer of polyurethane, an A class surface can now be obtained in an SRIM article. The surface layer of polyurethane may be from 0.1–0.2" thick, preferably 0.125". It is preferable for the intermediate layer be of the same polymer composition as the surface layers to avoid delamination problems due to differences in the coefficient of thermal expansion.

The present process also allows for molded articles to contain suitable fillers and reinforcing material and the like, stabilizer, mold release agents and other additives known to those of ordinary skill in the art as commonly employed in the field of polyurethane molding compositions, especially RIM, RRIM and SRIM molding compositions.

As reinforcing materials are included but not limited to chopped or milled glass fibers, chopped or milled carbon fibers, or mineral fibers such as calcium silicate or wollastonite fibers or mica. Particularly suitable are fiberglass reinforcement fibers, particularly those having lengths of from about 1/16" to about ¼".

It is also possible to form molded article with diminished density by using a blowing agent such as water, air or nitrogen. When water is used as the blowing agent 0.5 to 1.0 pbw based on 25 pbw of aromatic diamine is used. In addition, a blowing catalyst can also be used such as bis(2-dimethyl-aminoethyl)ether, available as a 70% solution in dipropylene glycol as A1 from Union Carbide. The blowing catalyst is used in an amount of 0.01–0.1 pbw based on 25 pbw of the aromatic diamine. A conventional foam stabilizer can also be added, such as 5614, a silicone foam stabilizer from Union Carbide, in an amount of from 0.5–1.0 pbw based on 25 pbw of aromatic diamine. The molded article has a homogenous non-cellular appearance, with no observable blistering. A decrease in specific gravity of from 1,100 kg/m$^3$ for the unblown material, to 700–500 kg/m$^3$ or less depending on the application, can be achieved. Specific gravities of between 1,100 kg/m$^3$ and 700 kg/m$^3$ are also possible. However, since the present polyurethane system allows for the preparation of molded articles of increased flexural modulus, without observing cold break, then by the addition of the blowing agent, a molded article of equal strength to previous molded articles can be obtained with less material and therefore less weight and less cost. The flexural modulus and density can therefore be traded off, by varying the % NCO content of the isocyanate component to obtain a final product with the same physical properties but lower weight.

Other features of the invention will become more apparent in the course of the following description of exemplary embodiments which are given for illustration of the invention and are not intended to be limiting thereof.

The physical properties of the polymers formed in the following examples were tested according to ASTM standards. Specifically Tensile Strength and % elongation were determined according to ASTM D638. Flexural Modulus was measured according to ASTM 790. Gardner Impact was measured according to ASTM D3029.

SYNTHESIS OF ISOCYANATE QUASI PRE-POLYMER

EXAMPLE 1

A uretonimine modified MDI (Tedimon-316 from EniChem, a 29% by weight of free NCO) was reacted with a 4,800 molecular weight polyether triol (glycerine starter) containing, with random distribution 70% by weight EO, 30% by weight PC (polyol TERCAPUR 1264 from EniChem) at 150° F. The material was dispensed into containers and checked for percent NCO, viscosity and reactivity.

Isocyanate quasi pre-polymers were made by this process with the following NCO percent:

| % NCO | T-316/T-1264 |
|---|---|
| 14 | 1/1 |
| 17 | 1.5/1 |
| 19 | 2/1 |
| 21 | 3/1 |
| 23 | 4/1 |
| 24 | 5/1 |
| 25 | 6/1 |

EXAMPLE 2

TABLE 1

| Composition | Reported in pbw | | |
|---|---|---|---|
| | 2a | 2b | 2c |
| Dimethylthio toluene diamine[1] | 25 | 25 | 25 |
| Polyol T-555[2] | 50 | 25 | 25 |
| Polyol T-844[3] | — | 50 | — |
| Polyol T-1264[4] | — | — | 50 |
| Dibutyl tin dilaurate | 0.1 | 0.1 | 0.1 |

TABLE 1-continued

| Composition | Reported in pbw | | |
|---|---|---|---|
| | 2a | 2b | 2c |
| Triethylene diamine (DABCO 33LV) | 2.0 | 2.0 | 2.0 |

[1]ETHACURE 300 from the Ethyl Corporation
[2]a 4,800 M$_n$ EO capped polyether triol OH #35 from EniChem (EO lower than 30% b.w.).
[3]a 4,800 M$_n$ EO capped polyether triol from EniChem. (EO lower than 30%)
[4]a 4,800 M$_n$ 70% EO and 30% PO random polyether triol from EniChem.

The compositions 2a, 2b, and 2c were each reacted with the isocyanate quasi pre-polymer according to Example 1 with an NCO content of 21% by weight at a 102 index, to form polyurethane compositions under the conditions hereinafter disclosed.

The properties are listed below in Table 2.

The polyurethane compositions were prepared under the following conditions:

Mold: 600×300 mm plate 3.1 mm thickness (weight 650–750 g)
Mold Temperature: 70° C.
Equipment: Gusmer high pressure machine model Delta
Rim 120
Output: 900 g/sec
Raw Material Temperature: 35° C.

TABLE 2

| Properties | Compos. | | |
|---|---|---|---|
| | 2a/21% NCO | 2b/21% NCO | 2c/21% NCO |
| Tensile Strength | 4,200 psi | 4,200 psi | 4,200 psi |
| Flexural Modulus | 80,000 psi | 80,000 psi | 80,000 psi |
| Gardner Impact | 320 in-lbs | 320 in-lbs | 320 in-lbs |
| % Elongation | 150% | 150% | 180% |
| Gel time | 6 sec | 6 sec | 6 sec |
| Demolding time | 45 sec | 40 sec | 35 sec |

Compositions 2a and 2b reacted with the 21% NCO isocyanate quasi pre-polymer molded with good results. Composition 2c molded with superior results and shows shorter curing times. Thus, rich ethylene oxide polyols allow for better processing behavior. No cold break was observed in all cases.

The compositions 2a, 2b, and 2c were each reacted with the isocyanate quasi pre-polymer according to Example 1 with an NCO content of 25% by weight at a 102 index, to form polyurethane compositions under the above mentioned conditions.

The properties are listed below in Table 3.

TABLE 3

| Properties | Compos. | | |
|---|---|---|---|
| | 2a/25% NCO | 2b/25% NCO | 2c/25% NCO |
| Tensile Strength | 4,242 psi | 4,242 psi | 4,242 psi |
| Flexural Modulus | 88,000 psi | 88,000 psi | 88,000 psi |
| Gardner Impact | 320 in-lbs | 320 in-lbs | 320 in-lbs |
| % Elongation | 150% | 150% | 180% |
| Gel time | 6 sec | 6 sec | 6 sec |
| Demolding time | 45 sec | 40 sec | 30–35 sec |

No cold break was observed on demolding.

TABLE 4

| Composition | Reported in pbw | | |
|---|---|---|---|
| | 3a | 3b | 2c |
| Dimethylthio toluene diamine[1] | 25 | 25 | 25 |
| Polyol T-555[2] | 35 | — | — |
| Polyol T-844[3] | — | 35 | — |
| Polyol T-1264[4] | — | — | 35 |
| Dibutyl tin dilaurate | 0.1 | 0.1 | 0.1 |
| Triethylene diamine (DABCO 33 LV) | 2.0 | 2.0 | 2.0 |

[1]ETHACURE 300 from the Ethyl Corporation
[2]a 4,800 $M_n$ EO capped polyether triol OH #35 from EniChem. (EO content <30%)
[3]a 4,800 $M_n$ EO capped polyether triol from EniChem. (EO <30%)
[4]a 4,800 $M_n$ 70% EO and 30% PO random polyether triol from EniChem.

The compositions 3a, 3b, and 3c were each reacted with the isocyanate quasi pre-polymer according to Example 1 with an NCO content of 21% by weight at a 102 index, to form polyurethane compositions under the conditions of Example 2.

The properties are listed below in Table 5.

TABLE 5

| | Compos. | | |
|---|---|---|---|
| Properties | 3a/21% NCO | 3b/21% NCO | 3c/21% NCO |
| Tensile Strength | — | — | 4,800 psi |
| Flexural Modulus | — | — | 120,000 psi |
| Gardner Impact | — | — | 320 in-lbs |
| % Elongation | — | — | 120% |
| Gel time | — | — | 5 sec |
| Demolding time | — | — | 30 sec |

The compositions 3a and 3b could not be molded without cold break and the molded articles fractured upon demolding. However, at that 1.4:1 polyol:aromatic diamine ratio, composition 3c, with the high ethylene oxide polyether polyol exhibited excellent molding properties, good demold, and produced a molded article with a high flexural modulus without exhibiting cold break.

The compositions 3a, 3b, and 3c were each reacted with the isocyanate quasi pre-polymer according to Example 1 with an NCO content of 25% by weight of at a 102 index to form polyurethane compositions under the conditions of Example 2.

The properties are listed below in Table 6.

TABLE 6

| | Compos. | | |
|---|---|---|---|
| Properties | 3a/25% NCO | 3b/25% NCO | 3c/25% NCO |
| Tensile Strength | — | — | 5,200 psi |
| Flexural Modulus | — | — | 160,000 psi |
| Gardner Impact | — | — | 200 in-lbs |
| % Elongation | — | — | 90% |
| Gel time | — | — | 5 sec |
| Demolding time | — | — | 30 sec |

The compositions 3a and 3b could not be molded without cold break and the molded articles fractured upon demolding. However, at the 1.4:1 polyol:aromatic diamine ratio, composition 3c exhibited excellent molding properties, good demolding time, and produced a molded article with a high flexural modulus without exhibiting cold break.

TABLE 7

| Composition | Reported in pbw | |
|---|---|---|
| | 4a | 4b |
| Diethyl toluene diamine[5] | 25 | 25 |
| Polyol WL 440[6] | 35 | — |
| Polyol G-600[7] | — | 35 |
| Dibutyl tin dilaurate | 0.1 | 0.1 |
| Triethylene diamine (DABCO 33 LV) | 2.0 | 2.0 |

[5]ETHACURE 100 from the Ethyl Corporation
[6]a 400 $M_n$ polyether triol from Texaco rich in EO
[7]a 600 $M_n$ polyether triol made from propylene oxide and glycerine from Enichem.

The compositions 4a and 4b were each reacted with the isocyanate quasi pre-polymer according to Example 1 with an NCO content of 21% by weight and 25% by weight to form polyurethane compositions. The polyurethane compositions were prepared under the conditions of Example 2 and the properties reported below in Table 8.

TABLE 8

| | Compos. | | | |
|---|---|---|---|---|
| Properties | 4a/21% NCO | 4b/21% NCO | 4a/25% NCO | 4b/25% NCO |
| Tensile Strength | 6,800 psi | — | 7,200 psi | — |
| Flexural Modulus | 202,000 psi | — | 232,000 psi | — |
| Gardner Impact | 320 in-lbs | — | 160 in-lbs | — |
| % Elongation | 40% | — | 30% | — |
| Gel time | 5 sec | — | 5 sec | — |
| Demolding time | 30 sec | — | 30 sec | — |

Composition 4a reacted with both the 21% and the 25% NCO isocyanate quasi pre-polymer molded with excellent results. Composition 4b, containing the 600 $M_n$ polypropylene extended glycerine triol, reacted with both the 21% NCO and 25% NCO isocyanate quasi prepolymer could not be demolded without cold break occurring. Example 5

TABLE 9

| Composition | 5 (pbw) |
|---|---|
| dimethylthio toluene diamine[1] | 25 |
| TEOA[8] | 5 |
| Polyol T-1264[4] | 35 |
| Dibutyl tin dilaurate | 0.1 |
| Triethylene diamine (DABCO) | 2.0 |

[1]ETHACURE 300 from the Ethyl Corporation
[4]a 4,800 $M_n$ 70% EO and 30% PO random polyether triol from EniChem
[8]a triethanolamine adduct with an OH #650

The composition 5 was reacted with the isocyanate quasi pre-polymer according to Example 1 with an NCO content of 21% by weight and 25% by weight to form polyurethane compositions. The polyurethane compositions were prepared as in Example 2.

TABLE 10

| | Compos. | |
|---|---|---|
| Properties | 5/21% NCO | 5/25% NCO |
| Tensile Strength | 5,800 psi | 6,100 psi |
| Flexural Modulus | 182,000 psi | 210,000 psi |
| Gardner Impact | 320 in-lbs | 160 in-lbs |
| % Elongation | 80% | 60% |
| Gel Time | 6 sec | 5 sec |

| Properties | Compos. 5/21% NCO | 5/25% NCO |
|---|---|---|
| Demolding Time | 35 sec | 30 sec |

Composition 5 reacted with both the 21% and the 25% NCO isocyanate quasi pre-polymer molded with excellent results.

EXAMPLE 6

Each of the Compositions 3c and 5 were sprayed with the isocyanate quasi prepolymer according to Example 1, with an NCO content of 21% by weight and 25% by weight, on a VR-3000 Gusmer Spray machine using a GX-7 gun and fiberglass molds. Each of the compositions with the high EO polyether polyol, which RIM molded well, also spray molded well. The physical properties of the spray molded articles were approximately 20% less than the physical properties of the RIM molded article of the same composition, due to the decrease in density from spray molding.

EXAMPLE 7

Composition 3c of Example 3 was RIM molded with the isocyanate quasi pre-polymer according to Example 1 with an NCO content of 21% by weight and 25% by weight with either water or nitrogen or air as a frothing agent. A polyurethane molded article with a density of 560 kg/m$^3$ was obtained.

EXAMPLE 8

To the composition 3e of Example 3 was also added 0.1 pbw water, 0.1 pbw NIAX A1 a chemical blowing catalyst containing 70% of bis(2-dimethyl-aminoethyl)ether and 30% dipropylene glycol from Union Carbide, and 1 pbw of 5614, a silicone based foam stabilizer from Union Carbide to form composition 8. Composition 8 was reaction injected molded with the isocyanate quasi prepolymer according to Example 1 with an NCO content of 21% by weight to form a polyurethane molded article of decreased density. The molded article had a specific gravity of only 700 kg/m$^3$ where the material in the absence of water and the blowing catalyst has a specific gravity of 1,100 kg/m$^3$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reaction injection molding process comprising reacting:
    A) an isocyanate quasi pre-polymer component comprising the reaction product of:
        i) a uretonimine modified MDI having a free isocyanate content of from 20–30% by weight NCO; and
        ii) a polyether triol component obtained from the reaction of a triol starter with a mixture of ethylene oxide and propylene oxide, containing 10–85% by weight of ethylene oxide and having a number average molecular weight of from 400–6,000; and
    wherein said isocyanate quasi pre-polymer has a free isocyanate content of from 10–27% by weight NCO; and
    B) a polyol component comprising:
        i) 25–250 pbw of a polyether polyol component of functionality of 2–3 having from 65–100% by weight ethylene oxide units and 0–50% by weight propylene oxide units and a number average molecular weight of 400–6,000;
        ii) 25 pbw of an aromatic diamine; and
        iii) 0–40 pbw of an aminic polyol;
        iv) 0.01–0.5 pbw of an organometallic urethane forming catalyst; and
        v) 0–5.0 pbw of an amine urethane forming catalyst, wherein pbw is based on 25 pbw of the aromatic diamine component.

2. The process of claim 1, wherein said polyether polyol (B(i)) component contains 65–85% EO and 15–35% PO.

3. The process of claim 1, wherein said polyether polyol (B(i)) contains 70% EO and 30% PO.

4. The process of claim 1, wherein said polyether polyol (B(i)) component has a number average molecular weight of from 4,000–5,000.

5. The process of claim 1, wherein said polyether triol (A(ii)) has a number average molecular weight of from 4,000–5,000.

6. The process of claim 1, wherein said process is reinforced reaction injection molding.

7. The process of claim 1, wherein said process is structural reaction injection molding.

8. The process of claim 1, wherein said process is spray molding.

9. A composition for a RIM process comprising:
    A) an isocyanate quasi pre-polymer component comprising the reaction product of:
        i) a uretonimine modified MDI having a free isocyanate content of from 20–30% by weight NCO; and
        ii) a polyether triol component obtained from the reaction of a triol starter with a mixture of ethylene oxide and propylene oxide, containing 10–85% by weight of ethylene oxide and having a number average molecular weight of from 400–6,000;
    wherein said isocyanate quasi pre-polymer has a free isocyanate content of from 10–27% by weight NCO; and
    B) a polyol component comprising:
        i) 25–250 pbw of a polyether polyol component of functionality of 2–3 having from 50–100% by weight ethylene oxide units and 0–50% by weight propylene oxide units and a number average molecular weight of 400–6,000;
        ii) 25 pbw of an aromatic diamine; and
        iii) 0–40 pbw of an aminic polyol;
        iv) 0.01–0.5 pbw of an organometallic urethane forming catalyst; and
        v) 0–5.0 pbw of an amine urethane forming catalyst, wherein pbw is based on 25 pbw of the aromatic diamine component.

10. A method of forming a polyurethane molded article comprising reaction injection molding the composition of claim 9.

11. A method of forming a reinforced polyurethane molded article with an A class surface comprising;
    i) forming a first layer of the composition of claim 9;
    ii) forming a second layer of the composition of claim 9 by structural reaction injection molding.

12. A molded article obtained by reaction injection molding of
    A) an isocyanate quasi pre-polymer component comprising the reaction product of:

i) a uretonimine modified MDI having a free isocyanate content of from 20–30% by weight NCO; and ii) a polyether triol component obtained from the reaction of a triol starter with a mixture of ethylene oxide and propylene oxide, containing 10–85% by weight of ethylene oxide and having a number average molecular weight of from 400–6,000; and wherein said isocyanate quasi pre-polymer has a free isocyanate content of from 10–27% by weight NCO; and B) a polyol component comprising:

i) 25–250 pbw of a polyether polyol component of functionality of 2–3 having from 65–100% by weight ethylene oxide units and 0–50% by weight propylene oxide units and a number average molecular weight of 400–6,000;

ii) 25 pbw of an aromatic diamine; and iii) 0–40 pbw of an aminic polyol;

iv) 0.01–0.5 pbw of an organometallic urethane forming catalyst; and v) 0–5.0 pbw of an amine urethane forming catalyst, wherein pbw is based on 25 pbw of the aromatic diamine component.

13. A molded article obtained by reaction injection molding of

A) an isocyanate quasi pre-polymer component comprising the reaction product of:

i) a uretonimine modified MDI having a free isocyanate content of from 20–30% by weight NCO; and ii) a polyether triol component obtained from the reaction of a triol starter with a mixture of ethylene oxide and propylene oxide, containing 10–85% by weight of ethylene oxide and having a number average molecular weight of from 400–6,000; and wherein said isocyanate quasi pre-polymer has a free isocyanate content of from 10–27% by weight NCO; and B) a polyol component comprising:

i) 25–250 pbw of a polyether polyol component of functionality of 2–3 having from 65–100% by weight ethylene oxide units and 0–50% by weight propylene oxide units and a number average molecular weight of 400–6,000;

ii) 25 pbw of an aromatic diamine; and iii) 0–40 pbw of an aminic polyol;

iv) 0.01–0.5 pbw of an organometallic urethane forming catalyst;

v) 0–5.0 pbw of an amine urethane forming catalyst;

vi) 0.05–1.0 pbw of water;

vii) 0.01–0.1 pbw of a chemical blowing catalyst; and viii) 0.5–1.0 pbw of a foam stabilizer, wherein pbw is based on 25 pbw of the aromatic diamine component.

14. The molded article according to claim 12, wherein said molded article has a flexural modulus of $\geq 80,000$ psi at 75° F. and being substantially free of "cold break properties".

15. The reaction injection molding process of claim 1, wherein said polyether polyol component is a random heteropolymer of polyethylene oxide and polypropylene oxide units.

16. The composition of claim 9, wherein said polyether polyol component is a random heteropolymer of polyethylene oxide and polypropylene oxide units.

17. The molded article of claim 12, wherein said polyether polyol component is a random heteropolymer of polyethylene oxide and polypropylene oxide units.

18. The molded article of claim 13, wherein said polyether polyol component is a random heteropolymer of polyethylene oxide and polypropylene oxide units.

* * * * *